No. 777,460. PATENTED DEC. 13, 1904.
F. V. WHYLAND & C. P. HOLLISTER.
REGULATABLE POWER TRANSMISSION DEVICE.
APPLICATION FILED MAR. 4, 1904.
NO MODEL. 4 SHEETS—SHEET 2.
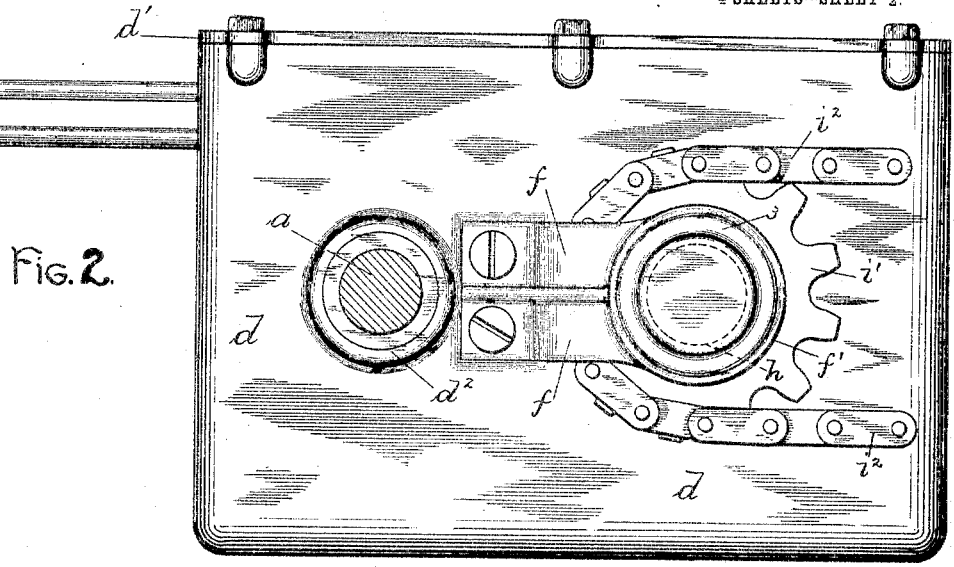
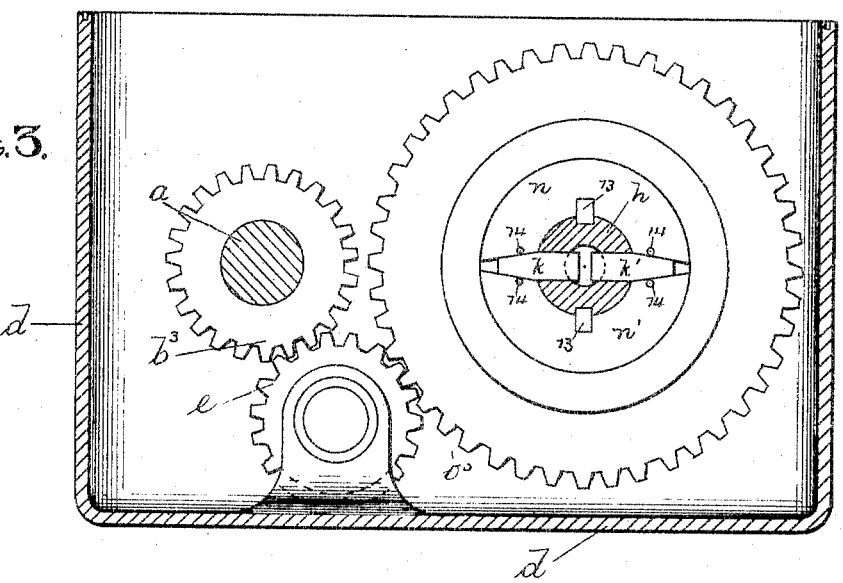
WITNESSES:
A. Berrell
Chas. H. Smith
INVENTORS.
Frank V. Whyland;
Clarence P. Hollister.
BY Harold Serrell
ATTORNEY.

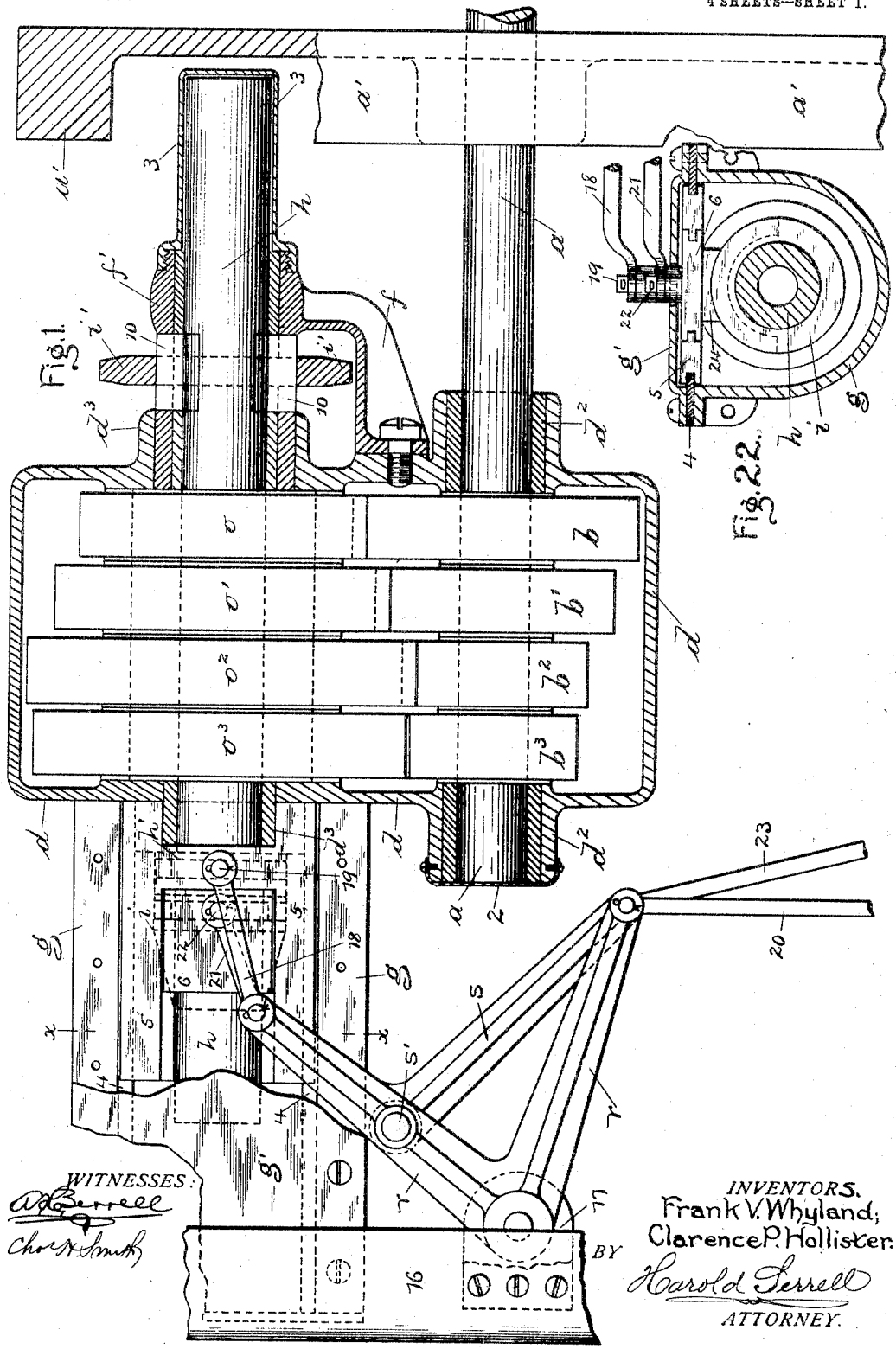

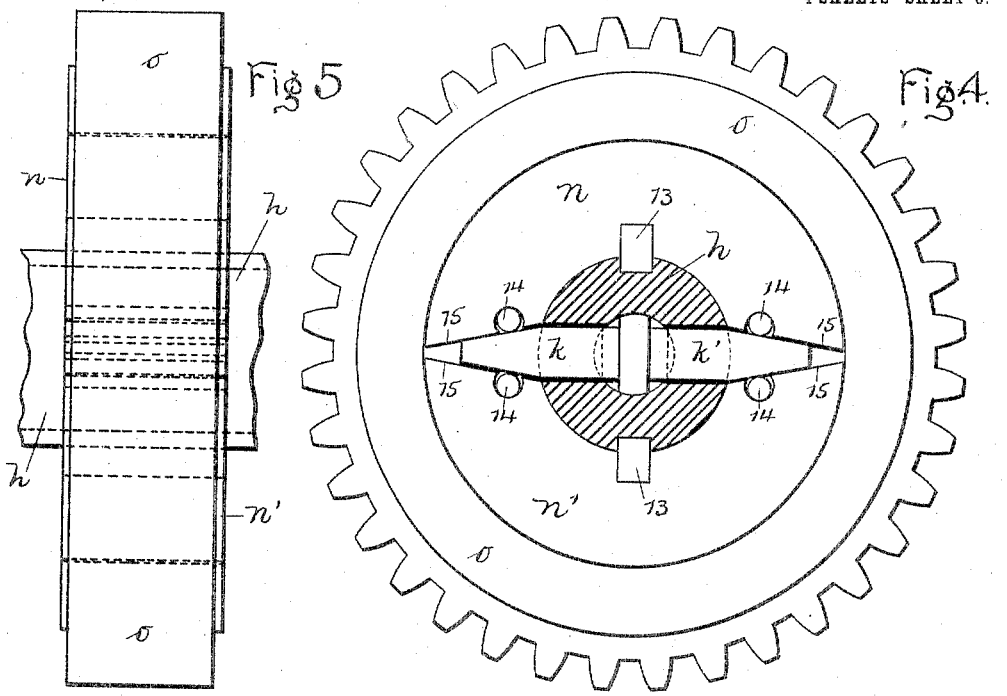

No. 777,460. PATENTED DEC. 13, 1904.
F. V. WHYLAND & C. P. HOLLISTER.
REGULATABLE POWER TRANSMISSION DEVICE.
APPLICATION FILED MAR. 4, 1904.
NO MODEL. 4 SHEETS—SHEET 4.
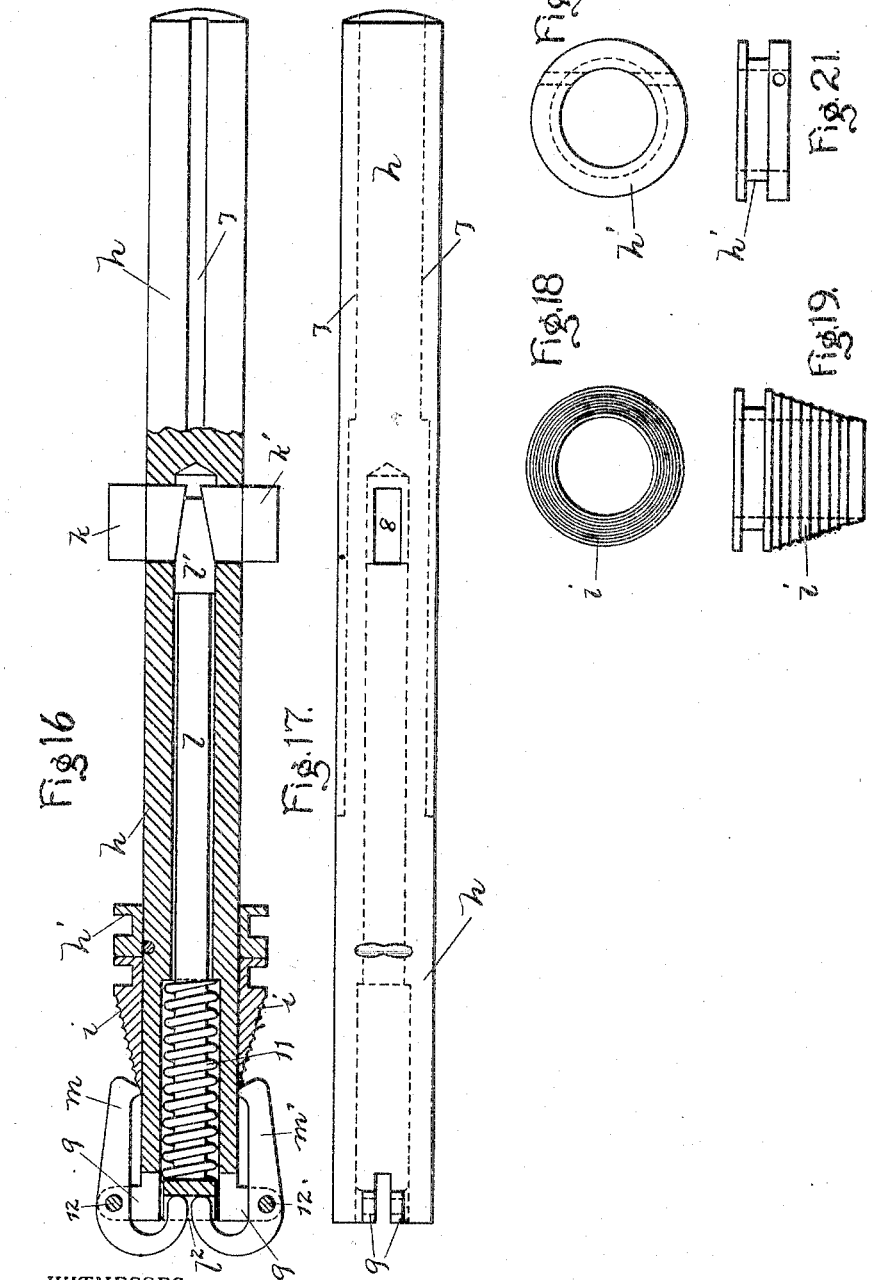
WITNESSES:
INVENTORS.
Frank V. Whyland,
BY Clarence P. Hollister.
Harold Serrell
ATTORNEY.

No. 777,460. Patented December 13, 1904.

UNITED STATES PATENT OFFICE.

FRANK V. WHYLAND AND CLARENCE P. HOLLISTER, OF PITTSFIELD, MASSACHUSETTS.

REGULATABLE POWER-TRANSMISSION DEVICE.

SPECIFICATION forming part of Letters Patent No. 777,460, dated December 13, 1904.

Application filed March 4, 1904. Serial No. 196,478. (No model.)

*To all whom it may concern:*

Be it known that we, FRANK V. WHYLAND and CLARENCE P. HOLLISTER, citizens of the United States, residing at Pittsfield, in the county of Berkshire and State of Massachusetts, have invented an Improvement in Regulatable Power-Transmission Devices, of which the following is a specification.

Our invention relates to devices manually operated by which power is transmitted from a prime mover to devices to be operated, such as vehicles and machinery, and the speed thereof regulated, the object of our invention being to prolong the useful life of such devices, to reduce the total size of the structure and the number of levers, and consequently the number of operations required of the operator.

In carrying out our invention and in combination with the shaft of a prime mover, a series or bank of gears secured thereto and a case therefor, we provide a longitudinally-movable shaft, in part tubular and having oppositely-placed longitudinal grooves, a series or bank of ring-gears surrounding the shaft and provided with internal two-part friction segment-collars mounted on the shaft and having splines in the opposite grooves of said shaft by which the collars turn with said shaft, while the gears around the collars are free. A sprocket surrounding this shaft has keys in the grooves thereof, and a chain around this sprocket transmits the movement and power to the shaft to be driven. The shaft at the end of its tubular part is oppositely perforated for a pair of movable wedge-blocks, adapted outside the shaft to come between the juxtaposed edges of the parts of a segment-collar to spread the same to cause the frictional engagement of their peripheries with the ring-gear, by which the power of the prime-mover shaft is transmitted to the movable shaft to actuate the device to be driven. The action of these wedge-blocks is produced by the longitudinal movement in one direction of a wedge-bar in the tubular part of the movable shaft effected by a manually-operated grooved cone sliding on the shaft and swinging a pair of bent levers, which at one end bear upon the cone and at their other ends bear against and longitudinally move said wedge-bar. A spring returns the wedge-bar to an initial position when released. A grooved collar is keyed to the movable shaft and is engaged by a main bell-crank lever and link to move the shaft and parts connected therewith longitudinally. An auxiliary bell-crank lever is pivoted to an arm of the main bell-crank lever and connected by a disk to the grooved cone. A movement of the main bell-crank lever actuates the cone to effect a release of the wedge-blocks, simultaneously moving the movable shaft to change the position of the wedge-blocks, so that a different gear may be engaged to advance or reverse the speed and movement of the parts.

In the drawings, Figure 1 is a horizontal section and partial plan representing the essential features of our improvement. Fig. 2 is a side elevation of the case and section of the shaft of the engine or prime mover. Fig. 3 is a section through the case and a partial section and diagrammatic elevation of the parts within the case. Fig. 4 is a side elevation of one of the gears of the bank or series and section of the shaft passing through the same; and Fig. 5 is an edge view of the parts, Fig. 4. Fig. 6 is a side view, Fig. 7 an edge view, and Fig. 8 an end view, of one part of a friction segment-collar. Fig. 9 is an end view, Fig. 10 a side view, and Fig. 11 an inverted plan, of one of the wedge-blocks. Fig. 12 is an elevation of one of the rollers employed in connection with the segment-collars. Fig. 13 is an elevation of the wedge-bar. Fig. 14 is a view at one end of the same, and Fig. 15 is a plan of the wedge end of the bar. Fig. 16 is a longitudinal section and partial elevation representing the longitudinally-movable shaft and parts directly associated therewith. Fig. 17 is a plan of said shaft at right angles to the view Fig. 6 as if stripped of the other parts associated therewith. Fig. 18 is an end view, and Fig. 19 a a plan, of the cone upon said movable shaft. Fig. 20 is an end view, and Fig. 21 a plan, of the collar secured to said movable shaft; and Fig. 22 is a cross-section and partial elevation at about the dotted line *x x* of Fig. 1.

Referring particularly to Fig. 1, $a$ represents the shaft of an engine or other prime mover, and $a'$ a fly-wheel or part of the same.

$b$, $b'$, $b^2$, and $b^3$ represent a series or bank of gears of varying size secured upon the shaft $a$ and located within the case $d$. The case $d$ and its cover $d'$ are shown especially in Figs. 1, 2, and 3. This case is preferably of such form as to be partially filled with oil, so that the gears and the shafts therein are immersed in and run continuously in the oil and require no further lubrication. We provide an auxiliary gear $e$, mounted in bearings, preferably an integral part of the case, and this auxiliary gear meshes with the gear $b^3$ on the shaft $a$ and with the gear $o^3$ of the shaft $h$, hereinafter described. The form of the case is such that it is also adapted to exclude dust. The case is provided with bearings $d^2$ $d^3$ for the shafts $a$ and $h$. The shaft $h$, which is parallel to the shaft $a$ and extends through the case, is a longitudinally-movable shaft which in part is tubular, and we provide a bracket $f$, secured to the case and having a bearing $f'$ slightly distant from the case for the shaft $h$. A cover-cap 2 and a tubular cap 3 are secured to the case, covering over ends of the shafts $a$ and $h$. The case $d$ is made at one side with an auxiliary case $g$, having a cover $g'$, adjacent to which cover there are guide-plates 4 for a slide-plate 5, and the inner edges of this slide-plate 5 are made with guides for a central slide-plate 6.

The movable shaft $h$ is in part tubular—that is, it is provided with an offset bore extending in from one end slightly more than half the length of the shaft. It is also provided with grooves 7, extending longitudinally and at opposite points in the surface of the shaft. There are slots 8 at opposite points and at the end of the offset bore of the shaft and intermediate to the grooves 7. One end of the shaft is provided with lugs 9. Upon the shaft is a grooved collar $h'$, keyed thereto. Adjacent to the grooved collar $h'$, which surrounds the shaft $h$, there is a cone $i$, also surrounding the shaft and having a circumferential groove. Near the end of the shaft distant from the cone $i$ is a sprocket $i'$, provided with keys 10, entering the grooves 7 of the shaft and by which the sprocket is connected to the shaft, so as to compel the two to turn together. A chain $i^2$ surrounds the sprocket $i$ and extends to a device to which the power of the shaft $h$, through the sprocket and chain, is to be communicated. This is preferably a sprocket on another shaft, which shaft may be the axle of a vehicle of any desired character.

We provide wedge-blocks $k$ $k'$ with tapering sides, as shown in Fig. 9, and a tapering under surface, as shown in Figs. 9, 10, and 16. These are received in the slots 8 and extend through the same. Within the shaft $h$ in the bore thereof is located a wedge-bar $l$ with a wedge end $l'$, which comes between the inner inclined faces of the wedge-blocks. The opposite end of the wedge-bar $l$ is provided with a slotted head $l^2$, and a spring 11 surrounds the wedge-bar $l$ between the inner surface of the slotted head $l^2$ and the shoulder or offset portion of the bore of the shaft, the function of the spring being to force the wedge-bar longitudinally and away from the wedge-blocks.

In the lugs 9 of the shaft $h$ there are pivot-pins 12, and bent levers $m$ $m'$ are pivotally connected to these lugs by said pins, the short curved ends of the levers being received in the slotted end of the head $l^2$, which prevents the wedge-bar from turning. These levers come at diametrically opposite parts of the shaft $h$, and the free ends adjacent to the surface of the shaft are pointed and adapted to ride up the surface of the cone $i$ and rest in one of the progressive circular grooves thereof, which are plainly shown in Figs. 18 and 19.

On the shaft $h$ and within the case $d$ there are a series or bank of ring-gears $o$ $o'$ $o^2$ $o^3$, $o$ meshing with $b$, $o'$ with $b'$, $o^2$ with $b^2$, and $o^3$ with $b^3$ and $e$. Within each of the ring-gears $o$ $o'$ $o^2$ $o^3$ are two-part segment-collars $n$ $n'$. (See especially Figs. 4, 6, 7, and 8.) In width these segment-collars agree with the wider parts of the ring-gears, so that their respective faces substantially touch each other and touch the inner and opposite sides of the case, whereby there is no movement of said segment-collars in line with the shaft $h$. The shaft $h$ passes through the segment-collars, through the bearings of the case, and there are splines 13 in the grooves 7 of the shaft and in grooves provided in the inner surfaces of the series of two-part segment-collars—that is, the segment-collars of each gear of the bank. Thus the relation as well as the position of the two-part segment-collars to the shaft is assured, while the bank of gears $o$ $o'$ $o^2$ $o^3$ may turn around the segment-collars. The juxtaposed edges 15 of the parts of each segment-collar bear a tapering relation to one another, the angle agreeing with the angle of the wedge-blocks $k$ $k'$, and these juxtaposed faces are each provided with a groove receiving a roller 14, the diameter of which roller is slightly in excess of the depth of the groove, so that the surfaces of the wedge-blocks bear directly upon the rollers rather than upon the edges of the collars.

The case $d$ near one end is provided with a frame 16 and bearing-lugs 17 for a main bell-crank lever $r$. This lever is provided from one arm with a link 18 and from the other arm with a rod 20. A post 19, mounted upon the connecting member of the slide-plate 5, is connected to the link 18. An auxiliary bell-crank lever $s$ is pivoted at $s'$ to one arm of the main bell-crank lever $r$. One arm of the auxiliary bell-crank lever $r$ is connected to a link 21 and the other end to a rod 23. The slide-plate 6 has a post 22, to which the free end of the link 21 is connected. The slide-plate 6 and the slide-plate 5 are each provided with a block 24, the block of the slide-plate 5 being received in the groove of the collar $h'$ and the block of the slide-plate 6 in the groove of the cone $i$.

In the operation of the device the shaft $h$, with the collar $h'$, the wedge-blocks $k$, the wedge-bar $l$, spring 11, and levers $m$ $m'$, and the cone $i$ are moved bodily longitudinally by means of the main bell-crank lever $r$, its link 18, post 19, and the rod 20. This movement when there is no engagement of the rod 23 moves both bell-crank levers, both links 18 and 21, the slide-frames 5 6, and the cone $i$, with the collar $h$ and the shaft. This movement in either direction is to a predetermined extent controlled in any desired manner to bring the wedge-blocks $k$ $k'$ in line transversely of the shaft $h$ with any of the series of segment-collars, so as to couple up the shaft $h$ with either the ring-gear $o$, $o'$, $o^2$, or $o^3$. This movement simply brings the wedge-blocks into position for action according to the power or the speed desired with reference to the ratio of the respective gears. The movement of the auxiliary bell-crank lever $s$ by its rod 23 and independent of the main bell-crank lever $r$ moves the cone $i$ longitudinally of the shaft as an independent factor. The movement of this cone toward and against the levers $m$ $m'$ causes an engagement of the ends of said levers with the cone, spreading the levers, swinging the same and imparting a longitudinal movement to the wedge-bar $l$ against the action of the spring 11. This forces the wedge end $l'$ between the wedge-blocks $k$ $k'$ and the wedge-blocks $k$ $k'$ outward between the edges of the parts of the segment-collar, forcing the same apart and into intimate relation and forceful engagement at the peripheries thereof with the inner surface of a ring-gear, so as to frictionally engage the said collars with said ring-gear and cause the rotation that the shaft $a$ and one of its bank or series of gears is imparting to the ring-gear to be communicated from the ring-gear through the segment-collars to the shaft $h$, the sprocket $i'$, and the chain $i^2$. The gears $b$, $b'$, and $b^2$ are always in mesh with the ring-gears $o$ $o'$ $o^2$. Consequently these latter ring-gears are all the time running with the gears $b$, $b'$, and $b^2$. The gears $b^3$ and $o^3$ are not in engagement, except through the intermediate gear $e$. Consequently with these latter gears the rotation of the shaft $a$ imparted through the gear $e$ to the ring-gear $o^3$ is in a different direction with the ring-gear $o^3$ to the ring-gears $o$, $o'$, and $o^2$—in other words, in the opposite direction. Consequently when the shaft $h$ is moved longitudinally, as hereinbefore described, so as to bring the wedge-blocks $k$ $k'$ between the segment-collars within the ring-gear $o^3$, and the operation of the cone $i$ causes the wedge-blocks to be thrown out into engagement with the segment-collars and the segment-collars spread to grip the ring-gear a reverse movement is imparted to the shaft $h$, so that instead of driving the vehicle forward, as is the case with the engagement of the gears $o$ $o'$ $o^2$, a reverse and backward movement is imparted, which will cause the vehicle to back or with machinery to move in the opposite direction.

The cone $i$ and the bent levers $m$ $m'$ are so shaped and proportioned that a very slight separation of these levers by the cone will so throw out the wedge-blocks and spread the segment-collars as to cause an engagement of the collars with the ring-gear, and it will be apparent that as these parts wear more movement thereof is required to produce the same extent of frictional engagement and that for the purpose of this function the grooves on the inclination of the cone will cause a greater amount of movement of the levers in proportion as the cone is forced between the levers. Thus the wear of the parts is taken up and provided for.

From the illustration and the foregoing description it will be apparent that by means of the rod 20, the main bell-crank lever $r$, the link 18, the slide-plate 5, and the collar $h'$ the shaft $h$, with the wedge-blocks $k$ $k'$, may be moved longitudinally, so as to bring the wedge-blocks into line with the two-part segment-collars of either of the ring-gears $o$ $o'$ $o^2$ $o^3$ of the bank of gears and that after bringing such wedge-blocks into line the same may be forced outward to separate the said two-part segment-collars to frictionally grip the ring-gear with which the wedge-blocks are in line by the movement of the cone $i$, the bent levers $m$ $m'$, the wedge-bar $l$, and its end $l'$, the said cone being moved by the rod 23, auxiliary bell-crank lever $s$, link 21, and slide-plate 6.

This device is exceedingly simple, is quick and positive in action, and is not liable to get out of order. The parts are easy to adjust, are interchangeable, easy to dissemble as well as to assemble, and we prefer in making the respective banks of gears to make one of forged machinery steel and the other of phosphor-bronze, as the best results are thus obtained. The parts are so arranged that a forward movement of the lever insures a forward movement of the machine and a backward movement the full extent insures a backward movement of the machine. Thus it is substantially impossible for an operator to make any error.

We claim as our invention—

1. The combination with the shaft of a prime mover, a series or bank of gears secured thereto and bearings therefor, of a longitudinally-movable shaft, and means for communicating power and movement therefrom, a series or bank of ring-gears surrounding the movable shaft, friction devices within the ring-gears, devices associated with the movable shaft for engaging any of the friction devices and manually-operated devices for actuating the latter devices.

2. The combination with the shaft of a prime mover, a series or bank of gears secured thereto and bearings therefor, of a longitudinally-movable shaft and means for communicating power and movement therefrom, a series or bank of ring-gears surrounding the movable shaft, a single intermediate and auxiliary gear, friction devices within the ring-gears, devices associated with the movable shaft for engaging any of the friction devices, and manually-operated devices for actuating the latter devices.

3. In a power-transmission device, the combination with a prime-mover shaft, a gear secured thereto, a longitudinally-movable shaft, a two-part friction segment-collar surrounding the movable shaft, and a ring-gear closely surrounding the said segment-collar, a manually-operated device for longitudinally moving said shaft, means connected with the movable shaft adapted to be brought between the opposite edges of the segment-collar and manually-operated devices for engaging the said means with the parts of the collar to separate the same and cause their frictional engagement with the ring-gear to operate the same, substantially as set forth.

4. In a power-transmission device, the combination with a prime-mover shaft, a gear secured thereto, a longitudinally-movable shaft, a two-part friction segment-collar surrounding the movable shaft, and a ring-gear closely surrounding the said segment-collar, means for maintaining the relation of the segment-collar to the shaft to cause the same to turn together, wedge-blocks associated with the movable shaft adapted to come between the opposite edges of the segment-collar, a cone slidable upon the movable shaft, and means actuated thereby for forcing the wedge-blocks outward from the movable shaft and between the parts of the segment-collar to cause the same to grip the ring-gear.

5. In a power-transmission device, the combination with the shaft of a prime mover and a series or bank of gears of varying sizes secured thereto, of a longitudinally-movable shaft, a series of two-part friction segment-collars surrounding the movable shaft, and means for maintaining the relation of said collars to said shaft so as to cause them to turn with the shaft, a series of ring-gears surrounding and substantially agreeing in thickness with the segment-collars, a lever device for moving the said shaft longitudinally through the segment-collars, means connected to said shaft and adapted to come between the opposite edges of any pair of segment-collars, a longitudinally-movable wedge-bar for operating the said means, a spring for retracting the said wedge-bar to its initial position, levers for forcing the wedge-bar into its operative position and manually-operated means for actuating the said levers.

6. In a power-transmission device, the combination with a longitudinally-movable shaft and manually-operated devices for effecting the movement, said shaft having longitudinal grooves in its surface on opposite sides, of a two-part segment-collar surrounding said shaft with its juxtaposed edges formed at an inclination to one another, splines movable in the grooves of said longitudinally-movable shaft and engaging the grooves in the said collar, a ring-gear closely surrounding the said collar, wedge-blocks in the longitudinally-movable shaft at opposite points adapted to come between the juxtaposed edges of the said two-part segment-collar, a wedge-bar for actuating the said wedge-blocks to force the same outward between the parts of the segment-collar to separate the same and cause the collar to grip the surrounding ring-gear frictionally and with force sufficient to keep the two in a temporary and substantially fixed relation to one another, and manually-operated devices for actuating the said wedge-blocks.

7. In a power-transmission device, the combination with a longitudinally-movable shaft and manually-operated devices for effecting the movement, said shaft having longitudinal grooves in its surface on opposite sides, of a two-part segment-collar surrounding said shaft with its juxtaposed edges formed at an inclination to one another, splines movable in the grooves of said longitudinally-movable shaft and engaging grooves in the said collar, a ring-gear closely surrounding the said collar, wedge-blocks in the longitudinally-movable shaft at opposite points adapted to come between the juxtaposed edges of the said two-part segment-collar, a wedge-bar for actuating said wedge-blocks to force the same outward between the parts of the segment-collar to separate the same and cause the collar to grip the surrounding ring-gear frictionally and with force sufficient to keep the two in a temporary and substantially fixed relation to one another, manually-operated devices for actuating the said wedge-blocks, and rollers in grooves in the opposite inclined and juxtaposed edges of the two-part segment-collar, the said rollers being of slightly greater diameter than the depth of the grooves so as to project beyond the said edges and come in contact with the surfaces of the wedge-blocks.

8. In a power-transmission device, the combination with a longitudinally-movable shaft and manually-operated devices for moving the same, of the wedge-blocks $k$, $k'$ received in slots at opposite points of the shaft, and the shaft from said slots to one end being tubular, a wedge-bar $l$ having a wedge end $l'$ coming between the inner inclined faces of the wedge-blocks, a spring surrounding the wedge-bar at the opposite end and at one end bearing against a shoulder of the shaft and at the other against a head of the wedge-bar, levers $m, m'$ having ends in engagement with the end of the wedge-bar $l$, and said levers pivotally connected to said shaft, a cone $i$ loosely surrounding the said shaft, and manually-operated devices for moving the cone, whereby the cone may be forced between the free ends of the levers $m, m'$ to separate the same and cause a sufficient movement thereto which actuates the wedge-bar and its wedge end to throw the wedge-blocks outward, substantially as set forth.

Signed by us this 23d day of February, 1904.

FRANK V. WHYLAND.
CLARENCE P. HOLLISTER.

Witnesses:
FRED A. DOOLEY,
R. B. BARDWELL.